(12) United States Patent
Gerke (10) Patent No.: US 11,008,250 B2
(45) Date of Patent: May 18, 2021

(54) LASER PROCESSING (71) Applicant: Fianium Ltd., Southampton (GB)

(72) Inventor: Timothy Gerke, Portland, OR (US)

(73) Assignee: NKT PHOTONICS A/S

(*) Notice: Subject to any disclaimer, the term of this patent is extended or adjusted under 35 U.S.C. 154(b) by 189 days.

(21) Appl. No.: 14/738,839

(22) Filed: Jun. 13, 2015

(65) Prior Publication Data

US 2015/0375342 A1 Dec. 31, 2015

(30) Foreign Application Priority Data

Jun. 25, 2014 (GB) .................................... 1411304

(51) Int. Cl.
| | |
|---|---|
| *C03C 23/00* | (2006.01) |
| *B23K 26/062* | (2014.01) |
| *B23K 26/082* | (2014.01) |
| *B23K 26/53* | (2014.01) |
| *B23K 26/0622* | (2014.01) |
| *B23K 26/08* | (2014.01) |
| *B23K 26/06* | (2014.01) |

(52) U.S. Cl.
CPC ...... *C03C 23/0025* (2013.01); *B23K 26/0624* (2015.10); *B23K 26/0626* (2013.01); *B23K 26/0892* (2013.01); *B23K 26/53* (2015.10)

(58) Field of Classification Search
CPC .... B23K 26/365; B23K 26/53; B23K 26/408; B23K 26/0054; B23K 26/06; B23K 26/0624; B23K 26/0626; B23K 26/0892; C03C 15/02; C03C 23/0025
See application file for complete search history.

(56) References Cited

U.S. PATENT DOCUMENTS

| | | | |
|---|---|---|---|
| 5,632,916 | A | 5/1997 | Lappalainen et al. |
| 5,656,186 | A | 8/1997 | Mourou |
| 5,761,111 | A | 6/1998 | Glezer |
| 5,767,483 | A | 6/1998 | Cameron et al. |
| 6,160,568 | A | 12/2000 | Brodsky et al. |
| 6,231,196 | B1 | 5/2001 | Mahachek |
| 6,275,250 | B1 | 8/2001 | Sanders et al. |

(Continued)

FOREIGN PATENT DOCUMENTS

| | | |
|---|---|---|
| CN | 2496679 Y | 6/2002 |
| CN | 101320533 A | 12/2008 |

(Continued)

OTHER PUBLICATIONS

Sabapathy et al., "Low loss waveguide on chalcogenide glass using ultrafast laser at low repetition rate", Proc. SPIE vol. 8769 87693U (5 pages), (2013).*

(Continued)

*Primary Examiner* — Martin J Angebranndt
(74) *Attorney, Agent, or Firm* — Lathrop GPM LLP; Wm. Tucker Griffith (57) ABSTRACT

A laser processing method comprises generating a laser beam comprising laser pulses having a duration less than 1000 ps, focussing the laser beam to form a focal region inside a transparent material and varying the position of at least one of the focal region and the transparent material so as to provide a pulse-to-pulse overlap of between 45% and 99%, thereby to form a smooth material modification inside the transparent material.

10 Claims, 6 Drawing Sheets

(56) References Cited

U.S. PATENT DOCUMENTS

| | | | |
|---|---|---|---|
| 6,333,486 B1 | 12/2001 | Troitski | |
| 6,392,683 B1* | 5/2002 | Hayashi | B23K 26/0057 347/224 |
| 6,490,299 B1 | 12/2002 | Raevsky et al. | |
| 6,509,548 B1 | 1/2003 | Troitski | |
| 6,559,411 B2 | 5/2003 | Borgeson et al. | |
| 6,664,501 B1 | 12/2003 | Troitski | |
| 6,670,576 B2 | 12/2003 | Troitski et al. | |
| 6,906,283 B2 | 6/2005 | Arisawa et al. | |
| 6,919,530 B2 | 7/2005 | Borgeson et al. | |
| 7,060,933 B2 | 6/2006 | Burrowes et al. | |
| 7,284,396 B2 | 10/2007 | Barron et al. | |
| 7,294,454 B1* | 11/2007 | Said | G02B 6/13 219/121.19 |
| 7,388,889 B2 | 6/2008 | Renaud | |
| 7,626,138 B2 | 12/2009 | Bovatsek et al. | |
| 8,911,658 B2* | 12/2014 | Jiang | B41M 5/267 264/400 |
| 2001/0021293 A1* | 9/2001 | Kouta | G02B 6/12011 385/37 |
| 2002/0076655 A1* | 6/2002 | Borrelli | G11C 13/041 430/321 |
| 2002/0085824 A1* | 7/2002 | Dugan | G02B 6/13 385/129 |
| 2003/0035640 A1* | 2/2003 | Dugan | G02B 6/122 385/124 |
| 2003/0099452 A1* | 5/2003 | Borrelli | G02B 6/13 385/129 |
| 2004/0032566 A1 | 2/2004 | Nakada et al. | |
| 2006/0235564 A1 | 10/2006 | Troitski | |
| 2007/0051706 A1 | 3/2007 | Bovatsek et al. | |
| 2007/0059455 A1 | 3/2007 | Smole et al. | |
| 2008/0304525 A1 | 12/2008 | Kupisiewicz et al. | |
| 2009/0304331 A1* | 12/2009 | Herman | G02B 6/02128 385/37 |
| 2010/0012631 A1 | 1/2010 | Bovatsek et al. | |
| 2010/0025387 A1* | 2/2010 | Arai | B28D 5/00 219/121.69 |
| 2010/0040836 A1 | 2/2010 | Li et al. | |
| 2010/0084384 A1 | 4/2010 | Bovatsek et al. | |
| 2010/0086741 A1 | 4/2010 | Bovatsek et al. | |
| 2010/0119808 A1 | 5/2010 | Li et al. | |
| 2010/0294426 A1 | 11/2010 | Nasher | |
| 2011/0088924 A1 | 4/2011 | Nasher | |
| 2011/0089039 A1 | 4/2011 | Nasher | |
| 2011/0089067 A1 | 4/2011 | Scott et al. | |
| 2011/0123737 A1 | 5/2011 | Nasher | |
| 2011/0240617 A1 | 10/2011 | Xu et al. | |
| 2012/0081830 A1 | 4/2012 | Yeates et al. | |
| 2013/0279527 A1 | 10/2013 | Jiang | |
| 2013/0280449 A1 | 10/2013 | Riezman et al. | |
| 2014/0083986 A1* | 3/2014 | Zhang | B23K 26/0087 219/121.69 |
| 2014/0231390 A1* | 8/2014 | Nukaga | C03C 15/00 216/94 |

FOREIGN PATENT DOCUMENTS

| | | |
|---|---|---|
| CN | 102601521 A | 7/2012 |
| CN | 202563812 U | 11/2012 |
| DE | 19925801 A1 | 12/2000 |
| DE | 102008004995 B3 | 12/2008 |
| EP | 1138516 A2 | 10/2001 |
| ES | 2109161 A1 | 1/1998 |
| JP | 2007330970 A | 12/2007 |
| KR | 20020030524 A | 4/2002 |
| WO | 1999000215 A1 | 1/1999 |
| WO | 1999006857 A2 | 2/1999 |
| WO | 01/09899 * | 2/2001 |
| WO | 2007019991 A1 | 2/2007 |
| WO | 2009114375 A2 | 9/2009 |
| WO | 2010019194 A1 | 2/2010 |
| WO | 2011025903 A1 | 3/2011 |
| WO | 2011047325 A1 | 4/2011 |
| WO | 2011082920 A1 | 7/2011 |
| WO | 2012168293 A2 | 12/2012 |
| WO | 2013149747 A1 | 10/2013 |

OTHER PUBLICATIONS

Zhang et al., "Low-loss Type II waveguide writing in fused silica with single picosecond laser pulses", Opt. Expr., vol. 14(11) pp. 4826-4834 (May 2006).*
Moser et al., "Sub-surface channels in sapphire made by ultraviolet picosecond laser radiation and selective etching", Opt. Expr., vol. 19(24) pp. 24738-24745 (Nov. 2011).*
Will et al., "Optical properties of waveguides fabricated in fused silica by femtosecond laser pulses", Appl. Opt., vol. 41(21) pp. 4360-4364 (Jul. 2002).*
Eaton et al., "Transition from the thermal diffusion range to heat accumulation in high repetition rate femtosecond laser writing of buried optical waveguides", Opt. Expr. vol. 16(13) pp. 9443-9458 (Jun. 2008).*
Zhang et al., "Type II high-strength Bragg grating waveguides photowritten with ultrashort laser pulses", Opt. Expr., vol. 15(7) pp. 4182-4191 (Apr. 2007).*
Eaton et al., "Heat accumulation effects in femtosecond laser-written waveguides with variable repetition rate", Opt. Expr. vol. 13(12) pp. 4708-4716 (Jun. 2005).*
Fernandes, "Birefringence and Bragg grating control in femtosecond laser written optical circuits", Thesis (2012) (160 pages).*
Corbari et al., "Femtosecond versus picosecond laser machining of nano-gratings and microchannels in silica glass", Opt. Expr. vol. 21(4) pp. 3946-3958 (Aug. 2012).*
Alexeev et al., "Direct writing with high energy high repetition rate picosecond laser pulses". Phys. Procedia vol. 39 pp. 621-627 (2012).*
Miyamoto et al. "Evaluation of nonlinear absorptivity in internal modification of bulk glasses by ultrashort laser pulses", Opt. Expr., vol. 19(11 pp. 10714-10727 (May 2011).*
Lee et al. "performance of volume phase gratings manufactured using ultrafast laser inscription", Proc. SPIE 8450 artricles 84502X (9 pages) (2012).*
Examination Report under Section 18(3) from the UKIPO, Application No. GB1411304.7, dated Sep. 29, 2016.
Applicant's Reply to Examination Report and Amendments filed in the UKIPO, Application No. GB1411304.7, dated Jan. 27, 2017.
Examination Report under Section 18(3) from the UKIPO, Application No. GB1411304.7, dated Mar. 17, 2017.
A. J. Glass and A. H. Guenther, "Laser induced damage in optical materials: 7th ASTM symposium," Appl. Opt. 15, 1510-1529 (1976).
Hnatovsky, C., Taylor, R., Simova, E. et al. "Fabrication of microchannels in glass using focused femtosecond laser radiation and selective chemical etching" Appl. Phys. A (2006) 84: 47.
Wikipedia contributors. "Touchscreen." Wikipedia, The Free Encyclopedia. Wikipedia, The Free Encyclopedia, Aug. 11, 2016. Web. Sep. 6, 2016.
GB1411304.7 UKIPO Search and Exam Report, dated Dec. 1, 2014.
Reply to GB1411304.7 UKIPO Search and Exam Report, dated Aug. 26, 2016.
Rudolf van Renesse, vanRenesse Consulting, "New Subsurface Engraving Technique for High Resolution Marking of Glass" Authentication News (2008).
Gary Barrett and Ryomei Omote, "Projected-Capacitive Touch Technology" Information Display, Mar. 2010/vol. 26, No. 3, Society for Information Display, 17-18.
S. Nolte, C. Momma, H. Jacobs, A. Tünnermann, B. N. Chichkov, B. Wellegehausen, and H. Welling, "Ablation of metals by ultrashort laser pulses," J. Opt. Soc. Am. B 14, 2716-2722 (1997).
E. G. Gamaly, A. V. Rode, B. Luther-Davies, V.T. Tikhonchuk, Ablation of solids by femtosecond lasers: Ablation mechanism and ablation thresholds for metals and dielectrics, Physics of Plasmas, 9, 949-957 (2002).
M. Lenzner, J. Kruger, S. Sartania, Z. Cheng, Ch. Spielman, G. Mourou, W. Kautek, F. Krausz; "Femtosecond Optical Breakdown (56) References Cited

OTHER PUBLICATIONS in Dielectrics"; Physical Review Letters; 4076-4079, May 1998/vol. 80, No. 18; American Physical Society.

K. Eidmann, J. Meyer-teh-Vehn, T. Schlegel, S. Huller; "Hydrodynamic Simulation of Subpicosecond Laser Interaction with Solid-Density Matter"; Physical Review E; 1202-1214, Jul. 2000/vol. 62, No. 1; American Physical Society.

D. Du, X. Liu, G. Korn, J. Squier, G. Mourou; "Laser-induced breakdown by impact ionization in SiO2 with pulse widths from 7 ns to 150 fs"; Applied Physics Letters, 64, 3071-3073 (1994).

B.C. Stuart, M.D. Felt, A.M. Rubenchik, B.W. Shore, M.D. Perry; "Laser-Induced Damage in Dielectrics with Nanosecond to Subpicosecond Pulses"; Physical Review Letters; 2248-2251, Mar. 1995/vol. 74, No. 12; American Physical Society.

B Luther-Davies, E G Gamaliĭ, Y Wang, A V Rode, V T Tikhonchuk, "Matter in ultrastrong laser fields", Sov J Quantum Electron, 1992, 22 (4), 289-325.

B.C. Stuart, M.D. Felt, S. Herman, A.M. Rubenchik, B.W. Shore, M.D. Perry; "Nanosecond-to-femtosecond laser-induced breakdown in dielectrics"; Physical Review B; 1749-1761, Jan. 1996/vol. 53, No. 4; American Physical Society.

B. C. Stuart, M. D. Feit, S. Herman, A. M. Rubenchik, B. W. Shore, and M. D. Perry, "Optical ablation by high-power short-pulse lasers," J. Opt. Soc. Am. B 13, 459-468 (1996).

An-Chen Tien, Sterling Backus, Henry Kapteyn, Margaret Murnane, Gerard Mourou; "Short-Pulse Laser Damage in Transparent Materials as a Function of Pulse Duration"; Physical Review Letters; 3883-3886, May 1999/vol. 82, No. 19, American Physical Society.

S. Preuss, A. Demchuk, M. Stuke; "Sub-picosecond UV laser ablation of metals"; Applied Physics A Materials Science & Processing, 33, Jan. 1995/vol. 61, No. 1.

P.B. Corkum, F. Brunel, N.K. Sherman; "Thermal Response of Metals to Ultrashort-Pulse Laser Excitation"; Physical Review Letters, Dec. 1988/vol. 61, No. 25, American Physical Society.

A.M. Malvezzi, N. Bloembergen; "Time-Resolved Picosecond Optical Measurements of Laser-Excited Graphite"; Physical Review Letters, Jul. 1986/vol. 57, No. 1, American Physical Society.

Combined Search and Examination Report under Sections 17 & 18(3) in the UKIPO, Application No. GB1707925.2, dated Nov. 20, 2017.

Ams, M. et al., Investigation of ultrafast laser-photonic material interactions: challenges for directly written glass photonics, arXiv:0802.1966v1 [physics.optics] Feb. 14, 2008.

Reply to Combined Search and Examination Report under Sections 17 & 18(3) in the UKIPO, dated Nov. 20, 2017, Application No. GB1707925.2, filed May 18, 2018.

* cited by examiner

LASER PROCESSING

FIELD

This specification relates to a laser processing method to form a smooth material modification inside a transparent material, and to an associated apparatus. It also relates to a transparent material including an internal mark comprising laser-induced refractive index modification.

BACKGROUND

A method of transparent material processing with an ultrashort pulse laser is described in US patent publication number US2010/0025387, published on 4 Feb. 2010. This patent publication describes producing reflective marks which are difficult to detect with or without edge illumination. As described in paragraph [0168] of US2010/0025387, the reflective marks are produced when a "planar" crack is formed inside the material, the plane of the crack being defined by the axis of the writing laser beam and the direction of translation.

For some applications, the formation of cracks can be undesirable. For instance, in relation to gemstones such as diamond, cracks could devalue the stones. In touch-screen display materials, cracks could result in decreased strength, thereby increasing the touch screen's tendency to break.

SUMMARY

According to various embodiments of the present invention, it has been found that with certain laser processing parameters, a smooth material modification is formed inside transparent materials, thereby avoiding the formation of internal cracks.

In various embodiments, a laser processing method comprises generating a laser beam comprising laser pulses having a duration less than 1000 ps, focussing the laser beam to form a focal region inside a transparent material, and varying the position of at least one of the focal region and the transparent material so as to provide a pulse-pulse overlap of between 45% and 99%. In embodiments, the method comprises varying the position of at least one of the focal region and the transparent material so as to provide a pulse-pulse overlap of between 45% and 95%. In embodiments, the method comprises varying the position of at least one of the focal region and the transparent material so as to provide a pulse-pulse overlap of between 50% and 90%.

With a pulse-pulse overlap of between 45% and 99%, or between 45% and 95%, or between 50% and 90%, it has been found that a smooth material modification is formed inside the transparent material.

In an embodiment, the relative speed between the focal region and the transparent material, the repetition rate of the laser pulses and the diameter of the beam in the focal region are chosen so that the pulse-pulse overlap is within the appropriate range.

The term "smooth material modification" means that the region which has been modified remains a continuous mass (ie: it fills the space defined by its' outer boundaries) after the laser-induced modification. In embodiments, the formation of cracks and other material flaws is thus avoided. The material modification may comprise a modification of refractive index.

In embodiments, the fluence in the focal region is greater than the material modification threshold of the material, but below the bulk damage threshold of the material.

The transparent material may comprise unstrengthened or ion-exchange chemically strengthened alkali-aluminosilicate, sodium aluminosilicate, lithium aluminosilicate, and aluminosilicate glasses, fused silica, borosilicate glasses, including Schott BK7, and soda lime glasses. In the case of Gorilla glass or other chemically strengthened glass, the material modification is preferably made at or near the center of the glass (i.e: in the non ion-exchanged region). Methods according to embodiments of the present invention are also good candidates for forming internal marks in non-glass transparent materials, including crystalline and amorphous transparent materials, e.g: gemstones such as sapphire and diamond (including synthetic diamond), and also polymers.

In an embodiment, the method comprises forming a plurality of regions within the transparent material defined by smooth, laser-induced modification of refractive index. These regions may be formed with a pulse-pulse overlap between 45% and 99%, or between 45% and 95%, or between 50% and 90%. In this way, the laser processing method forms a mark inside the transparent material, the mark being visible when illuminated in an illumination direction and viewed in a viewing direction.

The present invention also provides a transparent material including an internal mark which is visible when illuminated in an illumination direction and viewed in a viewing direction, the internal mark comprising a plurality of regions defined by smooth, laser-induced refractive index modification, neighbouring regions being spaced apart by a distance within the range of 2 μm to 100 μm, and wherein said regions are arranged to cause light propagating in the illumination direction to be redirected such that the internal mark is visible when viewed in the viewing direction.

In various embodiments, the said plurality of regions are arranged so that the visibility of the internal mark changes if the viewing direction changes.

In various embodiments, the said plurality of regions are arranged so that the visibility of the internal mark changes if the illumination direction changes.

In an embodiment, the said plurality of regions are arranged so that the internal mark is visible when illuminated in a first illumination direction and viewed in a first viewing direction, but is not visible when illuminated in a second illumination direction and/or when viewed in a second viewing direction.

The present specification also provides a laser processing apparatus, comprising a laser source configured to generate a laser beam comprising laser pulses having a duration of less than 1000 ps, a focussing arrangement for forming a focal region inside a transparent material, and a movement device for varying the position of at least one of the focal region and the transparent material, and a controller configured to control the movement device to form a smooth material modification inside the transparent material by varying the position of at least one of the focal region and the transparent material to provide a pulse-to-pulse overlap of between 45% and 99%. In some embodiments, the pulse-pulse overlap is between 45% and 95%, or between 50% and 90%.

In various embodiments, the laser source comprises an ultrafast laser. Advantageously, the laser source may comprise a picosecond laser source. Picosecond laser sources are compact and are less complex than, for example, shorter pulse systems. In various preferred embodiments, the picosecond laser source comprises a passively modelocked SESAM based Master Oscillator Power Amplifier laser, though other types of modelocking arrangements are possible and within the scope of the invention, as described in more detail below.

Ranges described herein (e.g., "between 1 ps and 100 ps") are understood to be inclusive of the endpoints, unless endpoints are specifically excluded.

"Transparent," as that term is used herein with regard to a material, means that on a macroscopic scale (one where the dimensions are much larger than the wavelength of the photons in question), the photons can be said to substantially follow Snell's Law.

In the embodiments described herein, spot size is given in terms of the radius or diameter of the spot where the spot is circular. However, it is to be understood that the invention is not so limited, and that non circular "spots" can be used, in which case the diameter or radius specified, or ranges thereof, are to be taken to refer to the largest dimension of the spot (e.g: largest radius or diameter), with the $1/e^2$ criterion used to define the boundaries of the spot.

Furthermore, the artisan of ordinary skill understands that spot sizes for circular spots can be equivalently translated to an area by simple math, and the invention as described in terms of spot area instead of spot size. For example, a spot having a diameter of 10 μm corresponds to spot area of $\pi*$(focused spot size radius)$^2$, where in this instance the radius=5 μm, and again the $1/e^2$ criterion is used to evaluate the boundaries of the spot area. Determinations of fluence can also be made for areas and non-circular spots.

Marks are described herein as being "visible", such as visible at a certain viewing angles. Though "visible" can mean visible to the human eye, "vision" is not so limited in industrial and other processes or interest, and "visible" can mean, in such instances, machine visible, that is, visible in a machine vision process, such as a process using an illumination wavelength not typically visible to the human eye.

BRIEF DESCRIPTION OF THE DRAWINGS

In order that the invention may be more easily understood, embodiments thereof will now be described, by way of example only, with reference to the accompanying drawings, in which.

DETAILED DESCRIPTION

Overview

Figure 1:
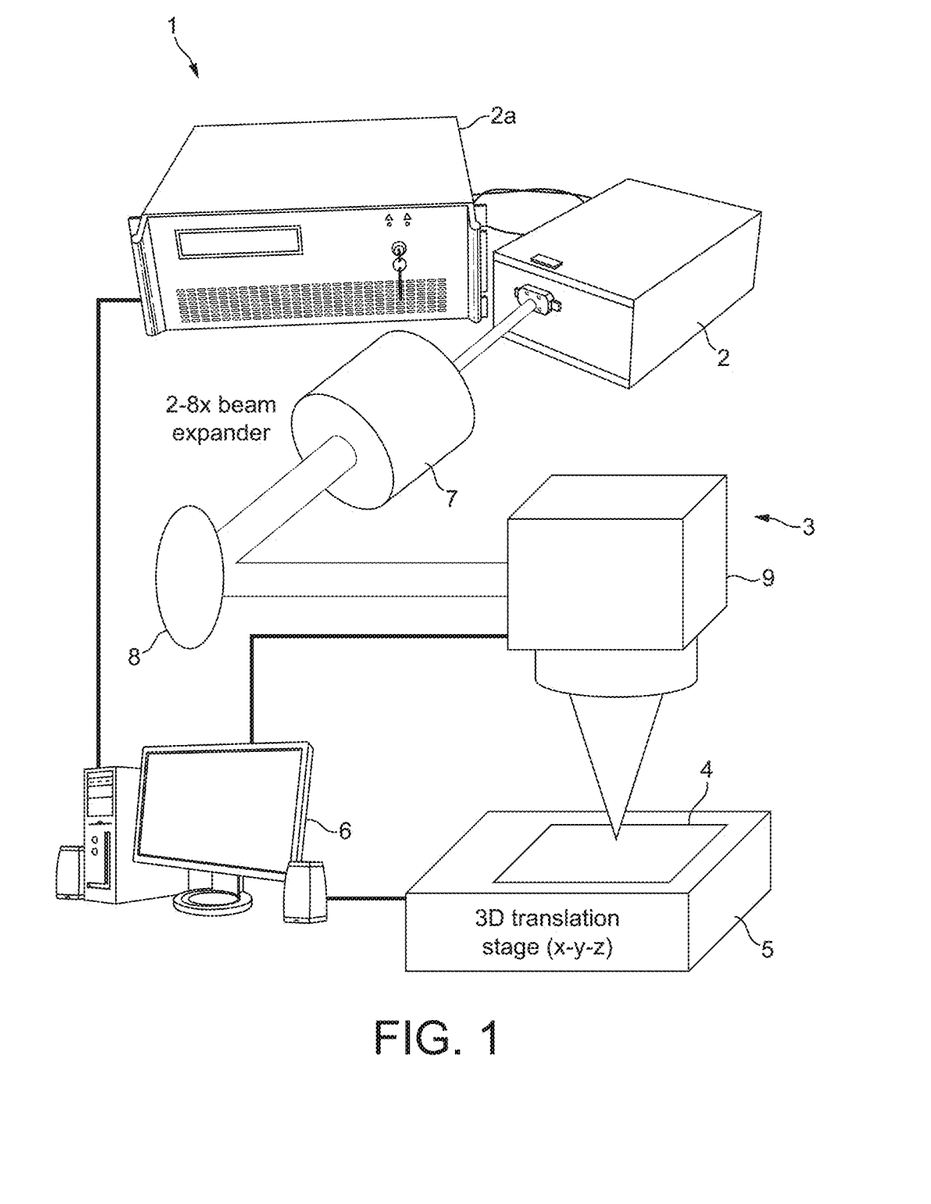
FIG. 1 illustrates a laser processing apparatus according to an exemplary embodiment.

FIG. 1 shows a laser processing apparatus 1 according to an exemplary embodiment. As shown, laser processing apparatus 1 includes a laser source 2 configured to generate a beam of laser pulses and a focussing arrangement 3 arranged to focus the beam of laser pulses inside a transparent material workpiece 4. A movement device comprising a translation stage 5 is arranged for varying the position of the transparent material relative to the focal region of the beam. The translation stage is under control of a controller 6, which in the particular embodiment shown in FIG. 1 comprises a computer controller that includes one or more of a display device and a manual input device (e.g: pointing and selecting device or keyboard). The controller 6 is configured to control the focussing arrangement 3, translation stage 5 and laser source 2 so as to modify an internal region of the transparent material workpiece 4.

Laser Source

The laser source 2 may be selected to generate laser pulses at a wavelength at which the transparent material has a low linear absorption, for example in the near infrared (e.g: 1064 nm), near ultraviolet (e.g: 355 nm) or in the visible spectrum (e.g: 532 nm), depending on the material to be processed.

The pulse duration of the generated pulses may be in the range of about 0.1 ps to 1000 ps, or in the range of 0.2 to 1000 ps, or in the range 1 ps to 1000 ps, or in the range of 1 ps to 100 ps. In some embodiments, the pulse duration is in the range of 2 ps to 30 ps.

The laser pulses may be generated at a repetition rate of between 10 KHz and 2 MHz. In a preferred embodiment, the pulse repetition rate is 200 kHz.

In one example, the laser source comprises a master oscillator power amplifier (MOPA) laser such as a modelocked MOPA. The modelocking element can be passive or active, such as a saturable absorber, which can be a transmissive device, or a reflective device such as a semiconductor saturable absorber mirror (SESAM). The saturable absorber can, for example, be based on a semiconductor, carbon nanotube, graphene, or any other mechanism known in the art for achieving optical saturable absorption for passive modelocking. As will be appreciated by those skilled in the art, a saturable absorber has specific optical properties which can be optimised for the laser cavity, for example non-saturable loss and relaxation time. It will be understood that the modelocked pulses may be generated in other ways, for example by modelocking based on nonlinear polarization evolution. Modelocking may be external or internal to the cavity, or "hybrid", that is, a combination of external and internal modelocking.

The MOPA may generate radiation at 1064 nm. A frequency-doubling arrangement may be provided to harmonically double the generated radiation to 532 nm before it is focussed within the transparent material. The laser source may be an all-fiber laser. As used herein, the term "all fiber" used in reference to a device refers to a device that employs fiber elements (e.g., elements made in the fiber, such as a fiber Bragg grating) or fiber-pigtailed elements such optical communication within the "all fiber" device does not involve free space communication (except perhaps within a fiber pigtailed device). Optical communication within such an "all fiber" device is typically via fiber splices, connectorized fibers and the like. Alternatively, the laser source may comprise a fiber-bulk hybrid laser, e.g: a hybrid 1064 nm laser.

Operation of the laser source 2 may be controlled by a laser controller 2a, which in turn may be controlled by computer controller 6. Laser controllers to control operation of laser sources are well known per se and will not be described in any detail herein.

The average power (and therefore the energy per pulse) may be modified by adjusting the amplifier pump current so as to achieve the desired fluence within the transparent material. Other power control schemes are also possible. For example, a manual or motorized half-wave plate and a polarizing beamsplitter may be provided, or an acousto-optic or electro-optic modulator may be employed.

Focussing Arrangement

In the exemplary embodiment of FIG. 1, the beam emitted by the laser source 1 passes through beam expander 7, and is directed by mirror 8 into focussing device 9. The beam expander 7 may for example comprise a 2-8× beam expander.

Various focussing devices may be employed to achieve, for example, a focussed spot size having a $1/e^2$ spot size diameter in the range from about 2 μm to about 100 μm, or within the range from about 5 μm to about 100 μm, or within the range 5 μm to about 20 μm. In some embodiments, the focussed spot size has a $1/e^2$ spot size diameter in the range from 5 μm to 10 μm. In other embodiments, the focussed spot size has a $1/e^2$ spot size diameter in the range from 20 μm to 30 μm.

Those skilled in the art will appreciate that the focussing arrangement may be provided with fine focus control under control of computer controller 6. In various embodiments, the fine focus control may be configured to position the focussed laser beam waist position at any depth within suitable transparent material workpieces. In various embodiments, suitable transparent material workpieces have a thickness greater than the depth of focus (or Rayleigh range) of the laser beam, such that the laser-induced modification is formed inside the glass and not on the surface. In some examples, the transparent material workpiece has a thickness <=4 mm. Alternatively, the thickness of the transparent material workpiece may be greater than 4 mm.

Movement Device

In the example of FIG. 1, a computer-controlled translation stage 5 is employed to move the transparent material relative to the focal region of the beam. The translation stage may be configured to move the transparent material at a speed in the range from 1 mm/s to >3000 mm/s. The translation stage of FIG. 1 is a 3D (x-y-z) translation stage. However, in alternative embodiments a 2D (x-z) translation stage (for one axis field stepping) or a 1D translation stage (z only for focus) may be provided.

Instead of, or in addition to, moving the transparent material relative to the focal region of the beam, a 2-D or 3-D galvo scanner could alternatively or in addition be provided to control the location of the focal region, e.g: to provide a linear beam positioning speed in the range from 1 mm/s to >3000 mm/s.

In some embodiments, the focal region moves relative to the transparent material at a relative speed in the range from 50 mm/s to 1000 mm/s, or in the range from 100 mm/s to 2000 mm/s, or in the range from 200 mm/s to 400 mm/s.

Pulse-Pulse Overlap

According to various embodiments of the invention, the relative speed between the focal region and the transparent material, the repetition rate of the laser pulses and the diameter of the beam in the focal region are chosen so that the pulse-pulse overlap is between 45% and 99%. In some embodiments, the pulse-pulse overlap is between 45% and 95%. In some embodiments, the pulse-pulse overlap is between 50% and 90%.

Pulse-pulse overlap refers to overlap between the focal region defined by successive pulses. The spatial separation between successive pulses (in μm) can be calculated as:

Separation[μm]=speed[mm/s]/Rep Rate[kHz]

Where "speed [mm/s]" is the relative speed in mm/s between the focal region and the transparent material and "Rep Rate (Khz)" is the repetition rate of the laser pulses in Khz.

If the separation is greater than or equal to the diameter of the beam in the focal region, then the pulse-pulse overlap is zero. If the separation is less than the diameter of the beam in the focal region, then the pulse-pulse overlap can be determined by the following expression:

Overlap[%]=(1−(Separation[μm]/Focussed spot size [μm]))*100

Where "Focussed spot size [μm]" is the diameter of the beam in the focal region in μm.

It has been found that with a pulse-pulse overlap between 45% and 99%, or between 45% and 95%, or between 50% and 90%, a smooth material modification can be formed inside the transparent material. The output energy per pulse is chosen to produce a fluence value within the transparent material so that the smooth material modification is formed. The smooth material modification thus formed does not exhibit microcracks or microvoids.

In various embodiments, a fluence value is produced within the transparent material that it is greater than the refractive index modification threshold of the transparent material workpiece, such as by appropriate selection of the focused beam diameter together with the output energy per pulse. The fluence can be greater than the refractive index modification threshold but less than the bulk damage threshold of the material. In producing the smooth material modification, the beam can be focused within the transparent workpiece to have sufficient fluence to excite multi-photon absorption.

As noted above, the fluence can be less than the bulk damage threshold of the material. As will be appreciated by those skilled in the art, the bulk damage threshold of a material refers to the fluence value at which a crack, void or similar damage feature is produced.

Fluence is defined according to the following expression:

Fluence=Energy per pulse(J)/(π*(focused spot size radius)$^2$)

In some examples, e.g: in the case of a transparent material in the form of Corning Gorilla glass (GG2 glass) or close glass type analogues (including borosilicate), the fluence in the focal region may be between 4-20 J/cm$^2$. At fluences of above 100 J/cm$^2$ it has been found using pulses of 46 ps duration that a line of separated cracks is formed within GG2 glass.

By translating the focal region relative to the transparent material workpiece with the fluence below the bulk damage threshold of the material, a smooth material modification comprising a 2D or 3D pattern may be built up. Computer controller 1 controls the output of laser source 1, the focussing arrangement 3 and the movement device to create the desired pattern.

Examples

In an embodiment, the laser processing apparatus is capable of producing focused spot sizes in the range from about 2 μm to about 100 μm and of linear beam positioning speeds in the range from 1 mm/s to >3000 mm/s and capable of being programmed to produce alphanumeric, bar code, raster and vector scanned marks and having fine focus control capable of positioning the focused laser beam waist position at any z-position (depth) within the workpiece. The laser source is selected to have a wavelength in the near infrared, near UV or visible spectrum where the transparent material has very low linear absorption. The laser pulsewidth is selected to have a very short pulse duration, with a preferred range of about 0.1-1000 ps.

In one preferred embodiment of the present invention, the laser source 2 is a passively modelocked SESAM all-fiber MOPA 1064 nm laser, harmonically doubled to 532 nm, and emitting at a pulsewidth within the range of about 0.2 ps to 1000 ps, or about 1 ps to 100 ps, and more preferably within a range of about 2 ps to 30 ps. The laser 2 is incorporated into a laser processing system apparatus capable of producing focused spot sizes in the range from about 2 µm to about 100 µm and of linear beam positioning speeds in the range from 1 mm/s to >3000 mm/s and capable of being programmed to produce alphanumeric, bar code, raster and vector scanned marks and having fine focus control capable of positioning the focused laser beam waist position at any z-position (depth) within the workpiece. The focus of the 532 nm laser output is positioned inside the bulk of the transparent material workpiece and the location of the focus is controlled via a 2D or 3D galvo scanner. The focus can alternatively be fixed while the part is moved in 2D or 3D to build up the full mark. In either case output of laser source 1 can be synchronously controlled with the focus/part movement in order to create arbitrarily shaped marks. In one illustrative example, using a 5 ps laser output pulsewidth, the laser pulse repetition frequency is selected to be about 200 kHz and the linear translation speed focused spot is selected from a range of about 50-1000 mm/s and where the focused spot size diameter is in the range from about 5 to 10 µm, $1/e^2$.

In another preferred embodiment of the present invention, the process laser is a hybrid fiber and solid state 1064 nm laser, harmonically doubled to 532 nm, and emitting at a pulsewidth within the range of about 1 ps to 1000 ps, or about 1 ps to 100 ps, and more preferably within a range of about 2 ps to 30 ps.

In another preferred embodiment of the present invention, the laser source 2 is a hybrid 1064 nm laser, emitting at a pulsewidth within the range of about 1 ps to 1000 ps, or about 1 ps to 100 ps, and more preferably within a range of about 2 ps to 30 ps and is incorporated into a 1064 nm version of the laser processing apparatus described above. The laser processing apparatus is capable of producing focused spot sizes in the range from about 5 µm to about 100 µm and of linear beam positioning speeds in the range from 1 mm/s to >3000 mm/s and capable of being programmed to produce alphanumeric, bar code, raster and vector scanned marks and having fine focus control capable of positioning the focused laser beam waist position at any z-position (depth) within the workpiece. In one illustrative example, using about 20 ps laser output pulsewidth, the laser pulse repetition rate is selected to be about 200 kHz and the linear translation speed focused spot is selected from a range of about 100-2000 mm/s and the focused spot size diameter is chosen to be in the range from about 20 to 30 µm, $1/e^2$.

In another exemplary embodiment, the laser pulse repetition rate is 200 kHz and the relative speed between the focal region and the transparent material workpiece is 200-400 mm/s. The pulse-to-pulse spacing is around 1-2 µm, and for a 5-10 µm spot size the pulse to pulse overlap is between 50-90%.

In another embodiment, the transparent material is processed with near UV radiation, e.g: at 355 nm, which is above the UV cutoff for sapphire (about 140 nm), diamond, (about 220 nm) and for Corning alkali-aluminosilicate glass (about 350 nm).

In various embodiments, the focused beam diameter is selected in combination with the output energy per pulse to produce a fluence value within the transparent material workpiece which is greater than the refractive index modification threshold of the transparent material workpiece and such that the beam as focused within the transparent workpiece has sufficient fluence to produce smooth and variable index of refraction features in the bulk of transparent materials. The fluence can be such so as to excite multi-photon absorption and facilitate the production of smooth variation of the refractive index.

Using laser processing parameters as described herein, smooth lines or dots may be marked in the bulk of transparent materials. These lines or dots can be arranged in arbitrary shapes such as images, text, or logos and the size can be either micro- or macroscopic. The spacing of the lines and dots are larger than the focused spot size, but small enough to cover a significant portion of the bulk and the portion covered can directly relate to the visibility of the mark. The energy per pulse can also be increased to increase the visibility of the mark, and increasing the number of marks replicated in depth can also increase the visibility of the mark. The desired level of visibility can be tailored for the application: for cosmetic marks high visibility is often desirable, whereas for security watermarks and anti-counterfeiting low and virtually invisible marks are often desirable.

Embodiments also allow for the creation of marks that are invisible to the naked eye because of low contrast or small size under certain processing conditions. Under another set of processing conditions more easily visible marks can be made. By writing a number of identical marks at decreasing depths in the material, the visibility can be discretely controlled from virtually invisible to easily identifiable. Thus, in embodiments, the mark can be made invisible to the naked eye both micro- and macroscopically, difficult to see and only visible under certain illumination/viewing conditions, or quite easy to see under specific illumination/viewing conditions.

Advantageously, marks according to various embodiments of the invention are found not to require perpendicular illumination in order to be visible. Advantageously, it is not necessary to provide either a femtosecond laser source or tight focusing to form the marks, and the marks are observed to be free or substantially free of microcracks or microvoids.

Figure 2:
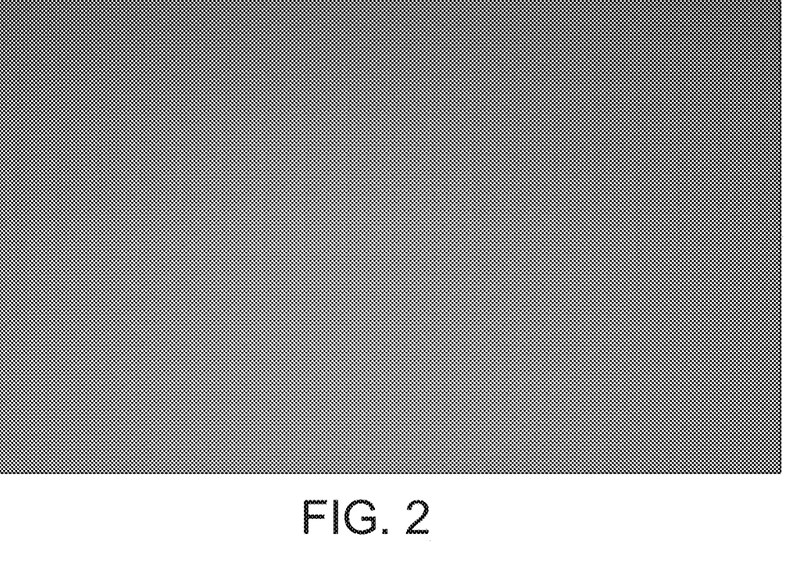
FIG. 2 illustrates a group of laser modified regions.

FIG. 2 illustrates a group of individual smooth laser modified regions in an intraglass watermark produced in a cross-section of a high quality soda lime glass microscope slide. The sample was cleaved to expose the laser modified areas. This particular material modification was formed with a constant focal depth using 20 ps laser output at a 1064 nm wavelength, with a spot size diameter of about 25 µm, $1/e^2$.

The index features may be oriented and ordered such that when viewed with a light source (light, LED, white diffuse surface) off axis in the background they appear as macro or microscopic marks when viewed at a particular angle. The marks can be stacked or multiplexed in a single location but oriented at various angles so that each mark is visible in a particular illumination/viewing condition. In this embodiment, the illumination source could be an array of sources at various angles each of which would result in a single mark of many written in the same location to be visible. Alternatively the illumination source and viewing angle could be singular and fixed so that the various marks appear alternately as the part is rotated in place. Alternatively the illumination source and part are fixed and the viewing angle/location can vary or be multiple fixed viewing devices such as cameras, photodetectors, or human eyes.

Laser processing apparatus according to various embodiments may be used to form marks within transparent materials which are visible in some illumination conditions but not others. Such marks (which are referred to herein as "watermarks", and which can also be referred to as "stealth marks") comprise smooth refractive index variations which define a plurality of spaced, laser-modified regions within the transparent material.

Figure 3:
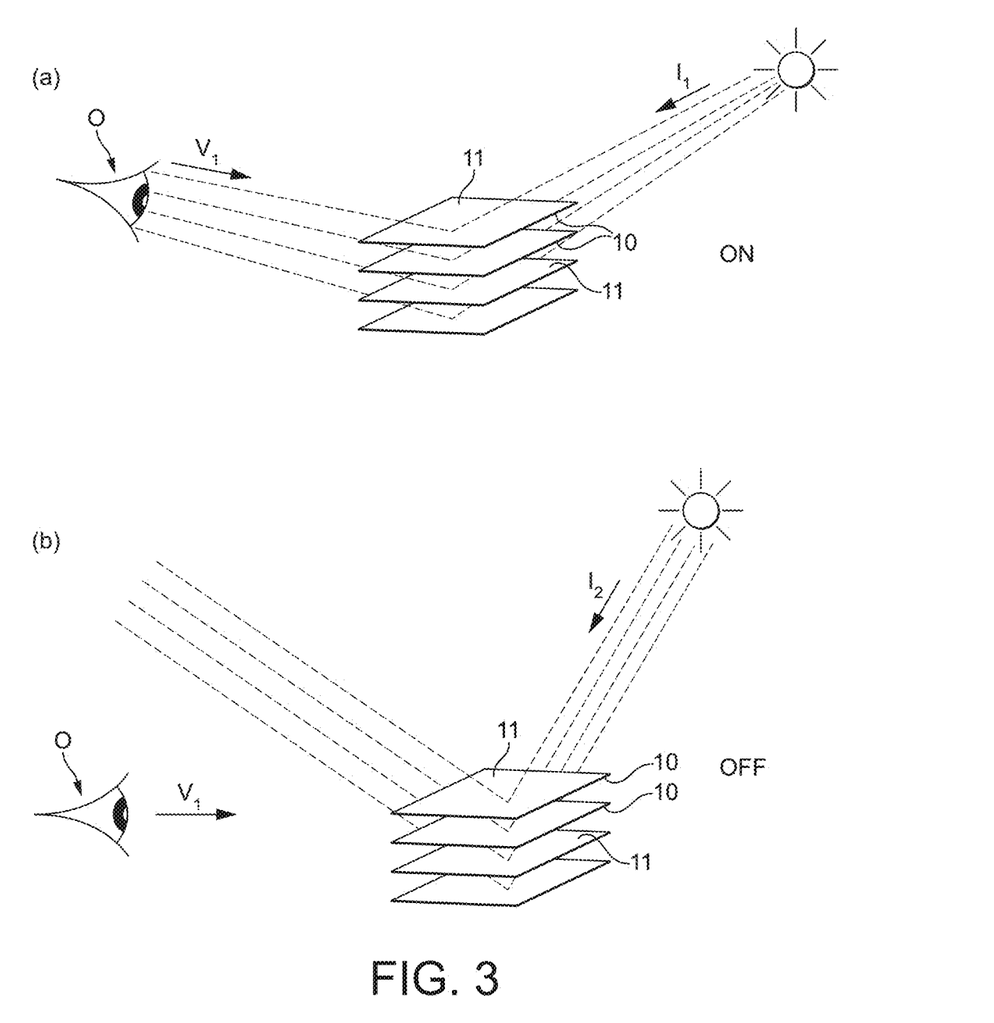
FIG. 3 schematically illustrates regions inside a transparent material in which the refractive index has been modified.

FIG. 3 (a) schematically illustrates regions 10 in which the refractive index has been modified by laser processing apparatus 1 within a transparent material. For clarity, the transparent material within which the regions 10 are formed is not shown in FIG. 3. In the example of FIG. 3(a), each region 10 comprises a generally rectangular planar region, but other shapes are possible.

As shown in FIG. 3(a), neighbouring regions 10 are spaced from one another. In this way, light is directed into a particular viewing direction when the regions 10 are illuminated by light directed in a corresponding illumination direction. The spacing between neighbouring regions 10 may be between 10 μm and 100 μm (e.g: 50 μm).

It will be understood that the regions 10 may form part of an overall watermark (not shown) comprising many further generally parallel regions.

As illustrated in FIG. 3(a), light directed in an illumination direction I1 is redirected by the regions 10 and can be viewed by observer O viewing the mark in a viewing direction V1. Thus, when illuminated in the illumination direction and viewed in the viewing direction, the watermark is visible. However, as illustrated in FIG. 3(b), when illuminated by light propagating in a different illumination direction I2, the observer O will not receive a substantial amount of the light redirected by the regions 10. Accordingly, the visibility of the watermark depends on the angle of illumination. It will be understood that if the illumination direction is kept the same and the watermark is viewed at different angles, the visibility of the watermark will be different at different viewing angles.

Redirection of light by the regions 10 may occur by specular reflection. That is, the regions 10 may comprise respective specularly reflecting interfaces 11 arranged so that strong reflection occurs into the viewing direction when the specularly-reflecting interfaces 11 are illuminated by light directed in a corresponding illumination direction. The term "specularly-reflecting" should not be understood to be limited to any particular reflectivity. The fraction of light reflected from each specularly-reflecting interface need not be high and could for example be only a few percent or less.

Figure 4:
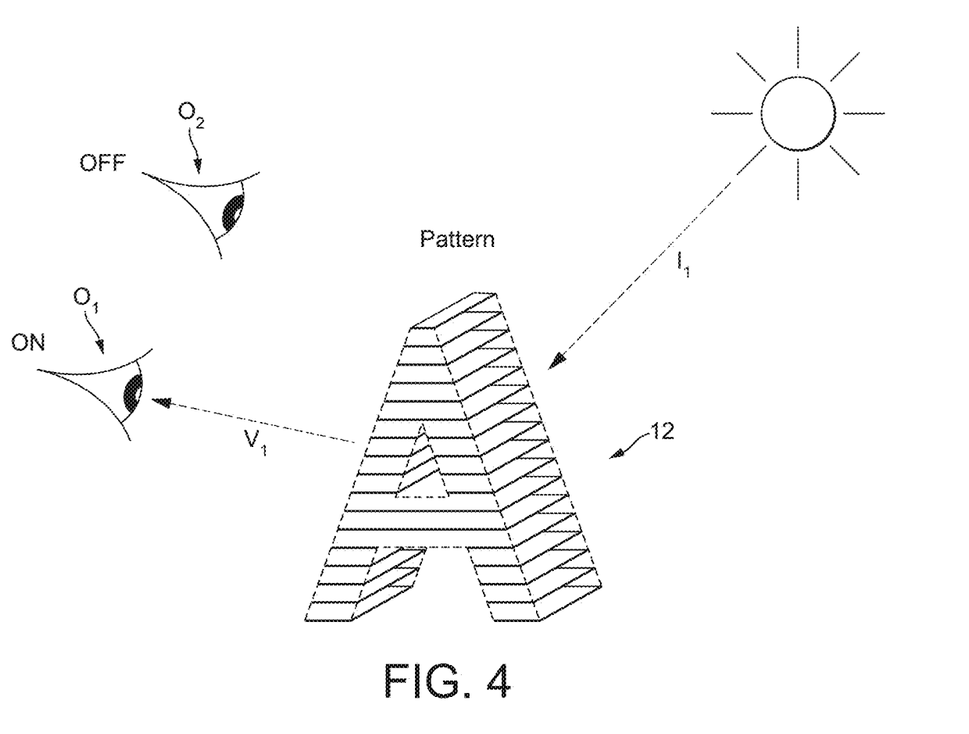
FIG. 4 schematically illustrates a watermark comprising a pattern formed inside the transparent material.
Figure 5:
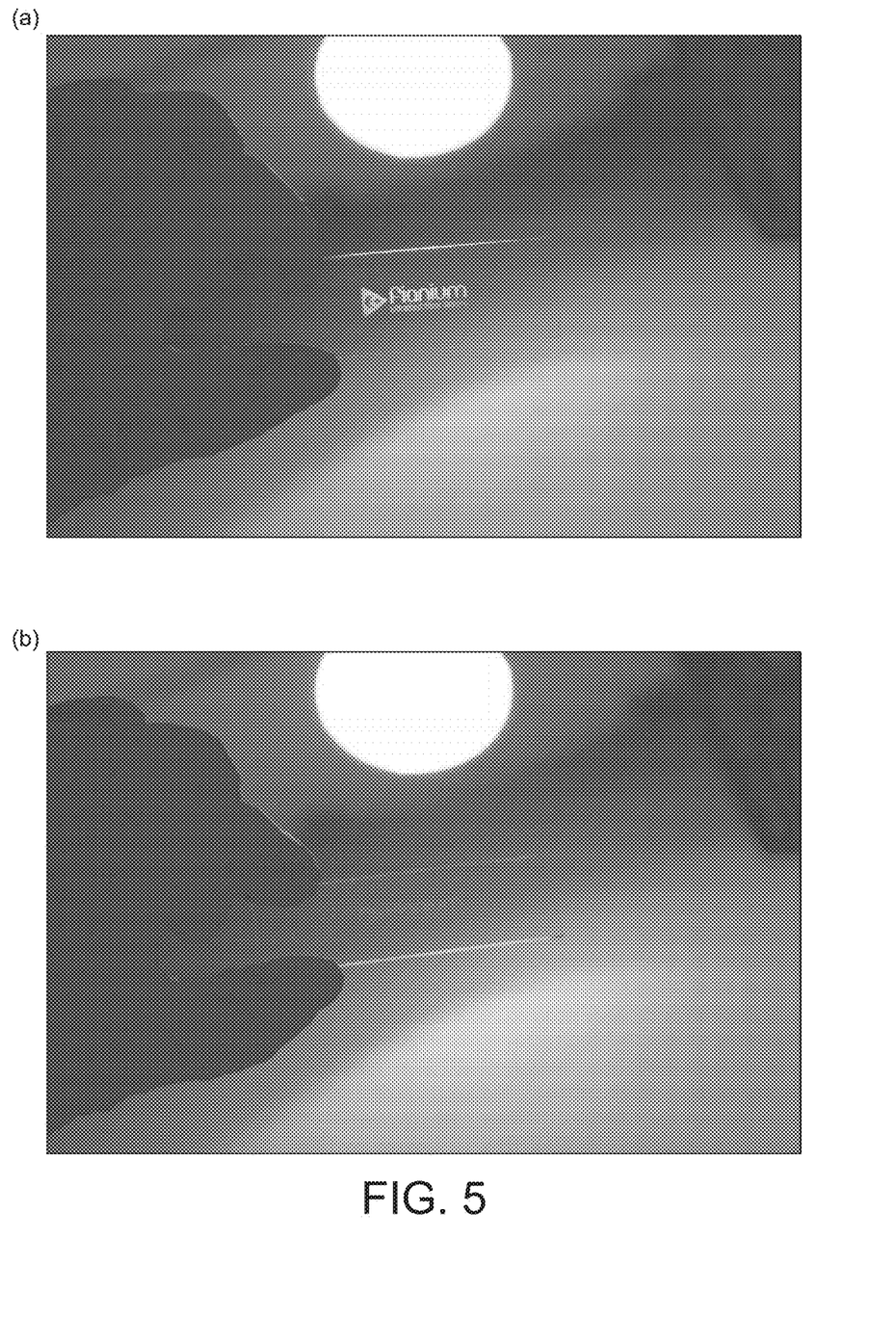
FIG. 5 shows an example of a transparent material which includes a watermark.

As illustrated in FIG. 4, regions 10 can be arranged to form a watermark comprising a pattern 12 formed inside the transparent material. The visibility of this pattern varies with viewing direction and/or illumination direction, for the reasons described above. For example, as illustrated in FIG. 4, when illuminated in an illumination direction I1, the watermark can be seen by observer O1 viewing in a viewing direction V1. However, observer O2 observes the watermark in a different viewing direction and thus does not receive a substantial amount of the light reflected by the regions 10. FIGS. 5(a) and 5(b) show an example of a transparent material in the form of a soda lime glass which includes a watermark comprising the Fianium logo. As shown in FIG. 5(a), when viewed with low angle illumination, the logo is visible. However, as shown in FIG. 5(b), when illuminated at larger angles, the visibility of the pattern is greatly reduced. It will be understood that instead of the Fianium logo, any other word, pattern, logo etc could be formed. Also, instead of soda lime glass, the transparent material may comprise unstrengthened or ion-exchange chemically strengthened alkali-aluminosilicate, sodium aluminosilicate, lithium aluminosilicate, and aluminosilicate glasses; fused silica; borosilicate glasses, including Schott BK7, or sapphire, gemstones or polymers.

Figure 6:
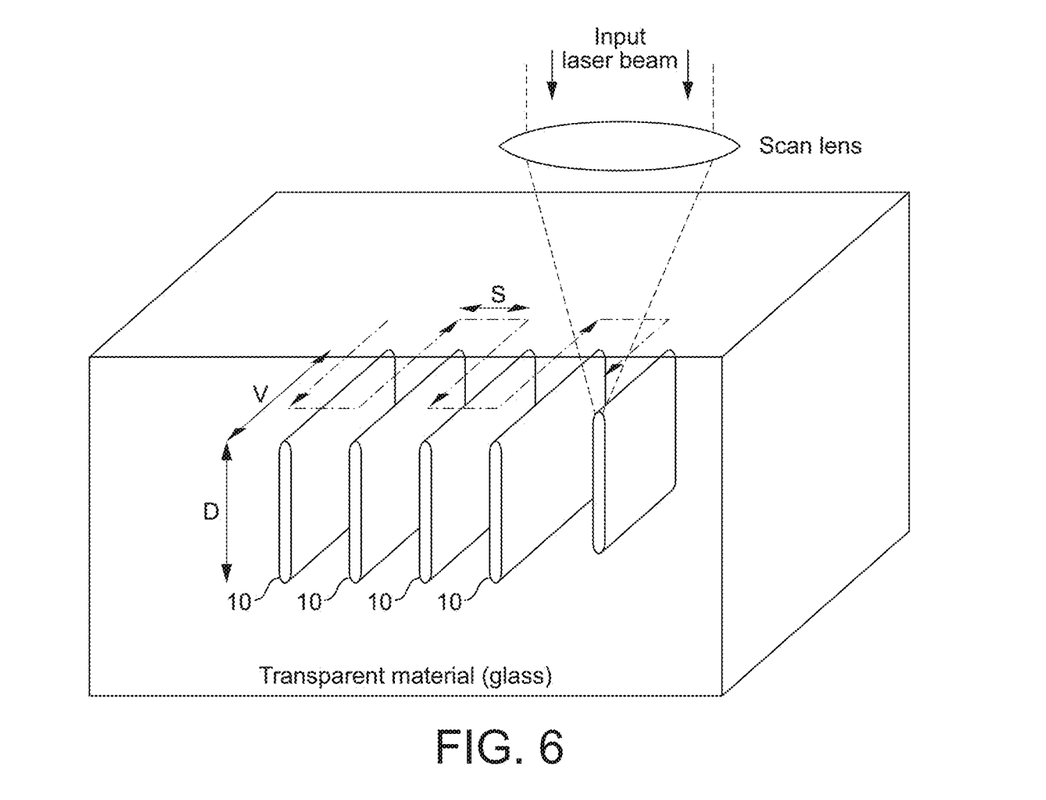
FIG. 6 schematically illustrates an exemplary process for forming regions of modified refractive index that make up a watermark.

Watermarks may be formed by selectively modifying the refractive index of the transparent material using the laser processing apparatus 1. FIG. 6 schematically illustrates an exemplary process for forming regions of modified refractive index 10 that make up a watermark. As shown, each region 10 of modified refractive index is formed by varying the position of the focal region relative to the transparent material. The relative speed is selected so that the pulse-pulse overlap is in the appropriate range, as described above. The length V of each region 10 depends on the pattern to be formed. The depth D may for example be between 10 μm and 100 μm, or between 30 μm and 50 μm. Once a region 10 is formed, the laser beam is turned off and the focal region is moved in a direction perpendicular to the previously formed region 10, to form a spacing S of between 10 μm and 100 μm (e.g: 50 μm) between neighbouring regions. The beam is then switched on again and the next region 10 is formed. It will be understood that in this example, neighbouring regions 10 are formed by varying the position of the beam in opposite directions, as shown in FIG. 6.

Although FIG. 6 illustrates forming a single array of planar regions 10, it will be understood that multiple layers of planar regions could be formed, one in front of the other. For example, between 1 and 8 layers could be formed. It has been found that increasing the number of layers generally increases the visibility of the watermark.

In some embodiments, multiple watermarks may be included within the same area of a transparent material. The angle of inclination of the regions 10 may be different for different watermarks within the material, so that different watermarks are visible in the same location at different viewing/illumination angles.

Instead of or in addition to redirection of light by specular reflection, redirection of light may occur due to diffraction or due to smooth phase changes caused by the refractive index modification. For example, each region 10 may comprise a diffracting region, or a region of phase modification that distorts incoming illumination, thereby to redirect light.

In the case of redirection by diffraction, the spacing between regions 10 may be small enough so that the marks act as diffractive bodies similar to volumetric gratings, and diffract the illumination orthogonal to the line or dot orientation and at a particular angle that is defined by the mark line or dot spacing and the illumination wavelength. The mark could be a 2D or 3D diffractive mark that when illuminated with a source a specified pattern is projected in the near-field or in the far-field. The projected pattern can be multiplexed such that when the mark is illuminated at different angles or with different wavelengths, different patterns are projected if the mark is 3D.

Embodiments in which the mark is a 2D or 3D diffractive mark allows a source to project an image or pattern onto a viewing screen or object in the near-field or far-field. This capability may be useful for example in the consumer electronics markets where a small laser, LED, or other suitable light source could be mounted under the mark and used to project a logo or other image in the far-field for the purpose of anti-counterfeiting.

As will be understood from the foregoing, in various embodiments of the present invention, subnanosecond pulses are used to form internal modifications to transparent materials, without forming cracks inside the material. Since no cracks are formed, the material modification does not significantly decrease the structural integrity of the material as a substrate, nor does it induce material flaws that could devalue the material. Various embodiments relate to a method for creating semi-visible watermarks inside bulk transparent materials using a non-contact picosecond laser direct writing process.

Many modifications and variations will be evident to those skilled in the art, that fall within the scope of the following claims:

The invention claimed is:

1. A laser processing method, comprising:
   forming a watermark in a glass material, wherein the watermark comprises a patterned volumetric grating which varies in visibility to the naked eye with changes in a viewing direction and/or an illumination direction, forming the watermark comprising forming a smooth refractive index modification inside the glass material, wherein forming the smooth refractive index modification comprises:
   generating a laser beam comprising laser pulses having a duration within the range of 2 ps to 1000 ps;
   focussing the laser beam to form a focal region inside the glass material; and
   varying the position of at least one of the focal region and the glass material so as to provide a pulse-to-pulse overlap of between 45% and 99%.

2. A laser processing method as claimed in claim 1, wherein the fluence in the focal region is less than the bulk damage threshold of the glass material.

3. A laser processing method as claimed in claim 1, wherein the laser pulses have a duration within the range of 2 ps to 30 ps.

4. A laser processing method as claimed in claim 1, wherein the focal region has a $1/e^2$ spot size diameter within the range of 2 µm to 100 µm.

5. A laser processing method as claimed in claim 4, wherein the focal region has a $1/e^2$ spot size diameter within the range of 5 µm to 10 µm.

6. A laser processing method as claimed in claim 1, wherein the laser pulses have a wavelength within the near-infrared, near UV, or visible region of the electromagnetic spectrum.

7. A laser processing method as claimed in claim 1, wherein forming the watermark comprises said varying the position of at least one of the focal region and the glass material to provide a pulse overlap of between 45% and 99%, thereby to form a plurality of regions defined by smooth, laser-induced modification of refractive index, wherein said plurality of regions are arranged to cause light propagating in the illumination direction to be redirected such that the mark is visible when viewed in the viewing direction.

8. A laser processing method as claimed in claim 7, wherein said plurality of regions define a plurality of layers.

9. A laser processing method as claimed in claim 1, wherein the smooth refractive index modification comprises a diffractive area.

10. A laser processing method as claimed in claim 1, wherein the position of at least one of the focal region and glass material is varied so as to provide a pulse-pulse overlap of between 50% and 90%.

* * * * *